(12) United States Patent
Chakraborty et al.

(10) Patent No.: US 10,635,636 B1
(45) Date of Patent: Apr. 28, 2020

(54) HYPER-V VIRTUAL MACHINE SYNTHETIC FULL BACKUP WHERE USER AND RECOVERY SNAPSHOTS COEXIST

(71) Applicant: EMC IP Holding Company LLC, Hopkinton, MA (US)

(72) Inventors: Anupam Chakraborty, Bangalore (IN); Sunil Yadav, Bangalore (IN); Soumen Acharya, Bangalore (IN); Tushar Dethe, Bangalore (IN); Suman Tokuri, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 512 days.

(21) Appl. No.: 14/581,901

(22) Filed: Dec. 23, 2014

(51) Int. Cl.
*G06F 16/00* (2019.01)
*G06F 16/11* (2019.01)
*G06F 11/14* (2006.01)
*G06F 9/455* (2018.01)

(52) U.S. Cl.
CPC ........ *G06F 16/128* (2019.01); *G06F 9/45558* (2013.01); *G06F 11/1451* (2013.01); *G06F 2009/45583* (2013.01); *G06F 2201/84* (2013.01)

(58) Field of Classification Search
CPC ........... G06F 17/00; G06F 17/30; G06F 16/00
See application file for complete search history.

(56) References Cited

U.S. PATENT DOCUMENTS

| | | | | |
|---|---|---|---|---|
| 9,535,776 B2 * | 1/2017 | Klose | ..................... | G06Q 10/06 |
| 2014/0195484 A1 * | 7/2014 | Wang | ................ | G06F 17/30215 707/624 |
| 2015/0074060 A1 * | 3/2015 | Varadharajan | ........ | G06F 16/188 707/609 |
| 2015/0074536 A1 * | 3/2015 | Varadharajan | ...... | G06F 11/1446 715/734 |
| 2015/0134733 A1 * | 5/2015 | Maturana | ................ | H04L 43/04 709/203 |
| 2015/0142745 A1 * | 5/2015 | Tekade | ................ | G06F 11/1451 707/646 |
| 2015/0142748 A1 * | 5/2015 | Gottemukkula | .... | G06F 11/1451 707/649 |
| 2015/0212889 A1 * | 7/2015 | Amarendran | ....... | G06F 11/1402 707/674 |
| 2015/0242263 A1 * | 8/2015 | Klose | ..................... | G06Q 10/06 714/47.3 |
| 2015/0242264 A1 * | 8/2015 | Vibhor | ................... | G06Q 10/06 714/57 |

(Continued)

*Primary Examiner* — Farhan M Syed
(74) *Attorney, Agent, or Firm* — Van Pelt, Yi & James LLP

(57) ABSTRACT

A virtual machine backup process where a plurality of types of snapshots of the virtual machine coexist includes: obtaining a list of files comprising virtual hard disks and differencing virtual hard disks associated with the virtual machine; sorting the list of files to identify relationships and to generate a current tree in which differencing virtual hard disks point to corresponding parent virtual hard disks; comparing the current tree with a previous tree associated with the virtual machine from the last backup of the virtual machine; identifying differencing virtual hard disks in the current tree that are not present in the previous tree as incremental backup data; and backing up the incremental data. The incremental data is merged with a previous synthetic full backup of the virtual machine to generate a new synthetic full backup of the virtual machine.

21 Claims, 3 Drawing Sheets

(56) References Cited

U.S. PATENT DOCUMENTS

| | | | | |
|---|---|---|---|---|
| 2015/0244775 A1* | 8/2015 | Vibhor | ............... | G06Q 10/06 709/203 |
| 2015/0278024 A1* | 10/2015 | Barman | ............ | H04L 67/1095 707/634 |
| 2015/0301903 A1* | 10/2015 | Mutha | ............... | G06F 11/1453 707/692 |
| 2015/0324255 A1* | 11/2015 | Kochunni | ......... | G06F 11/1448 711/162 |
| 2016/0063191 A1* | 3/2016 | Vesto | ............... | G06F 19/324 705/2 |

* cited by examiner

HYPER-V VIRTUAL MACHINE SYNTHETIC FULL BACKUP WHERE USER AND RECOVERY SNAPSHOTS COEXIST

BACKGROUND OF THE INVENTION

No provisions are provided by Microsoft for taking incremental backups of Hyper-V virtual machines when user and recovery snapshots coexist.

BRIEF DESCRIPTION OF THE DRAWINGS

Various embodiments of the invention are disclosed in the following detailed description and the accompanying drawings.

DETAILED DESCRIPTION

Figure 1:
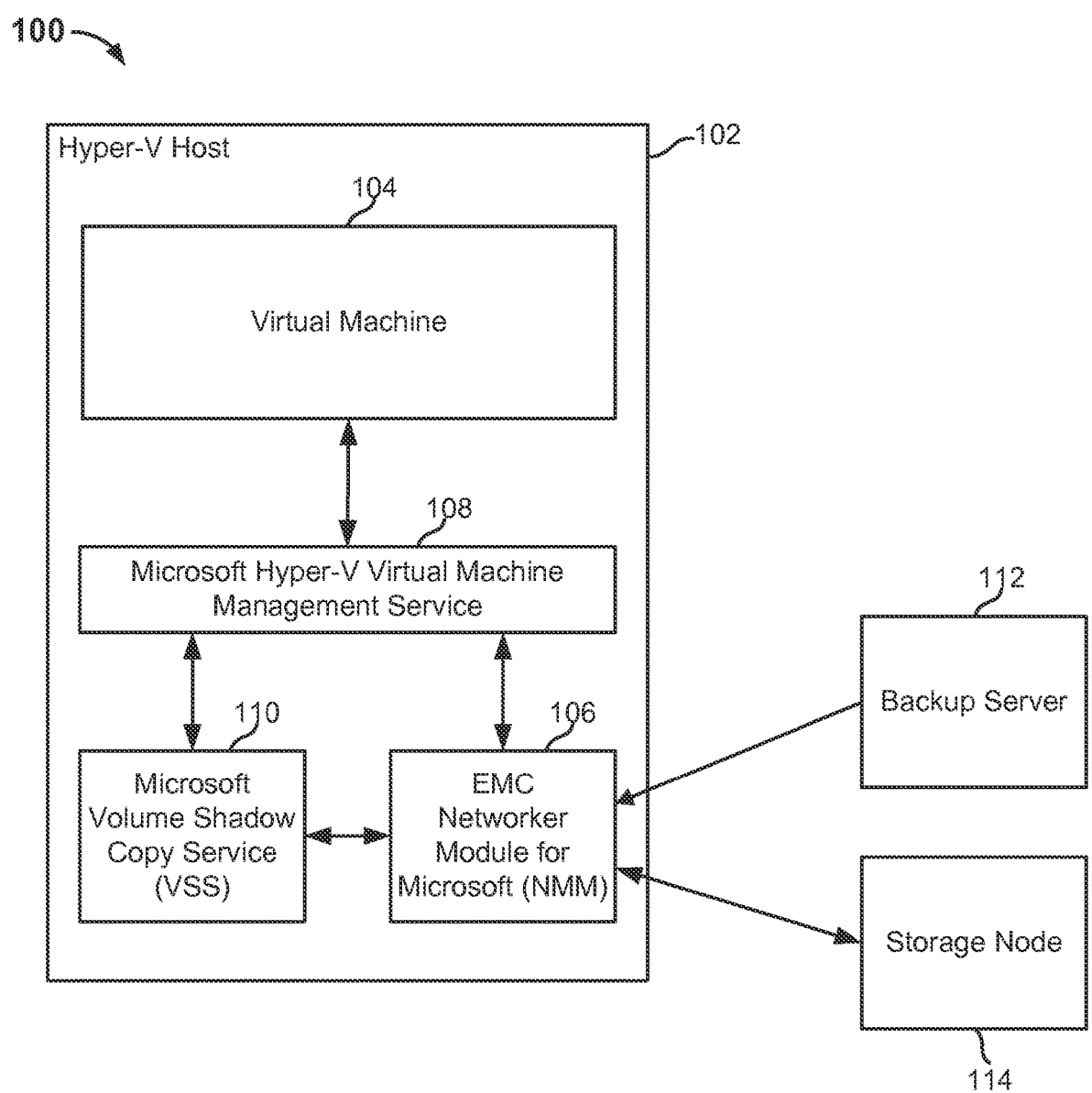
FIG. 1 is a high level block diagram illustrating an embodiment of a network environment in which a synthetic full backup of a virtual machine is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

A hypervisor manages the generation and execution of virtual machines on a host machine. An example of a hypervisor is Hyper-V, which is a native hypervisor for Microsoft Windows systems.

A backup operation may comprise a full or incremental backup. In a full backup of a virtual machine, all data corresponding to the virtual machine is stored. In an incremental backup of a virtual machine, only data that has changed since the last backup of the virtual machine is stored. When feasible, incremental backups may be preferred to achieve reduced storage consumption, network traffic, and backup time. In a synthetic full backup of a virtual machine, an incremental backup is performed and subsequently applied to the last synthetic full backup of the virtual machine to generate a current synthetic full backup of the virtual machine.

Incremental backups of Hyper-V virtual machines are supported by Windows Server 2012 and subsequently released Windows operating systems. Specifically, incremental backups leverage a special Hyper-V snapshot known as a recovery snapshot. Moreover, Hyper-V provides an option for a user to create a snapshot of a virtual machine known as a user snapshot, which provides a quick and easy way for the user to revert the virtual machine to a previous state.

A virtual machine snapshot captures the state, data, and hardware configuration of the virtual machine at the time the snapshot is generated. The snapshot creates a child virtual hard disk, i.e., a differencing virtual hard disk (AVHD), that points to its corresponding parent virtual hard disk. When a snapshot is created, all virtual machine operating system files, application data, and data changes made during the execution of the virtual machine are stored in an associated differencing virtual hard disk. Snapshots and differencing virtual disks create a chain or tree of child and parent virtual hard disks up to the top parent.

Techniques for generating a synthetic full backup of a Hyper-V virtual machine when recovery and user snapshots coexist are disclosed herein. As described in further detail below, in some embodiments, current and previous virtual hard disk trees are compared to identify new differencing virtual hard disks, i.e., those differencing virtual hard disks that have not been previously backed up. Such identified incremental backup data is applied to the last synthetic full backup of the virtual machine to generate a new or current synthetic full backup. Although many of the given examples are described with respect to Microsoft's Hyper-V hypervisor, the disclosed techniques may be similarly employed with respect to any other hypervisor platform that provisions for a plurality of types of snapshots that may need to be consolidated during a backup.

FIG. 1 is a high level block diagram illustrating an embodiment of a network environment in which a synthetic full backup of a virtual machine is performed. In network environment 100, host 102 comprises a physical machine running Hyper-V. Hyper-V manages the generation and execution of virtual machine (VM) 104 on host 102. Although a single virtual machine is depicted for the purpose of example, Hyper-V may generate and manage any number of virtual machines on host 102.

Various types of data are associated with virtual machine 104. For example, virtual machine 104 is associated with state data such as a configuration XML file, saved state file, memory .bin file, etc. Furthermore, virtual machine 104 comprises virtual hard disk data as well as child and parent relationships thereof (e.g., a pointer is created for each child or differencing virtual hard disk that points to its corresponding parent virtual hard disk). Moreover, virtual machine 104 comprises snapshot data that captures the state, data, and hardware configuration of the virtual machine for each point in time a snapshot is created. In the context of a Hyper-V virtual machine, for example, snapshot data may comprise user snapshot data and/or recovery snapshot data. A user snapshot may be manually created by a user at a desired time while a recovery snapshot may be created by an automatic backup process.

Backup of various Microsoft applications including Hyper-V is facilitated at host 102 by EMC Corporation's Networker Module for Microsoft (NMM) 106. As depicted, NMM 106 interfaces with Microsoft's Hyper-V Virtual Machine Management Service 108 and Volume Shadow Copy Service (VSS) 110 resident on host 102. NMM 106 communicates with these services during a backup of virtual machine 104.

A synthetic full backup of virtual machine 104 may be performed as desired and/or routinely. For example, an administrator may manually initiate a synthetic full backup and/or configure a backup policy that automatically schedules and initiates synthetic full backups at prescribed times or time intervals. In network environment 100, a synthetic full backup of virtual machine 104 is initiated by backup server 112. For example, backup server 112 may comprise EMC Corporation's NetWorker server.

A backup request from backup server 112 is received by NMM 106 at host 102. In response to receiving the backup request, NMM 106 communicates with Hyper-V Virtual Machine Management Service 108 and Volume Shadow Copy Service 110 to obtain a file list associated with virtual machine 104. The file list specifies the various virtual hard disks associated with virtual machine 104. By sorting the list to generate a current tree of virtual hard disks associated with virtual machine 104 and comparing with a previous tree of virtual hard disks associated with virtual machine 104 from the last backup, NMM 106 identifies the differencing virtual hard disks that have not previously been backed up, i.e., the incremental backup data.

To facilitate the backup, NMM 106 sends the differencing virtual hard disks containing incremental data from the previous backup to storage node 114. Moreover, NMM 106 sends configuration files associated with the virtual machine to storage node 114 for backup. In some cases, NMM 106 may appropriately edit various configuration files associated with virtual machine 104 (e.g., the virtual machine configuration XML file and the VSS writer's BCD (Backup Component Document) XML file) prior to backup.

A new synthetic full backup of virtual machine 104 is generated at storage node 114 by merging the incremental backup data provided by NMM 106 with the last synthetic full backup previously stored at storage node 114. Moreover, a tree of virtual hard disks associated with the virtual machine maintained at storage node 114 with the synthetic full backup is updated to include links (e.g., pointers) associated with the newly added differencing virtual hard disks.

Figure 2:
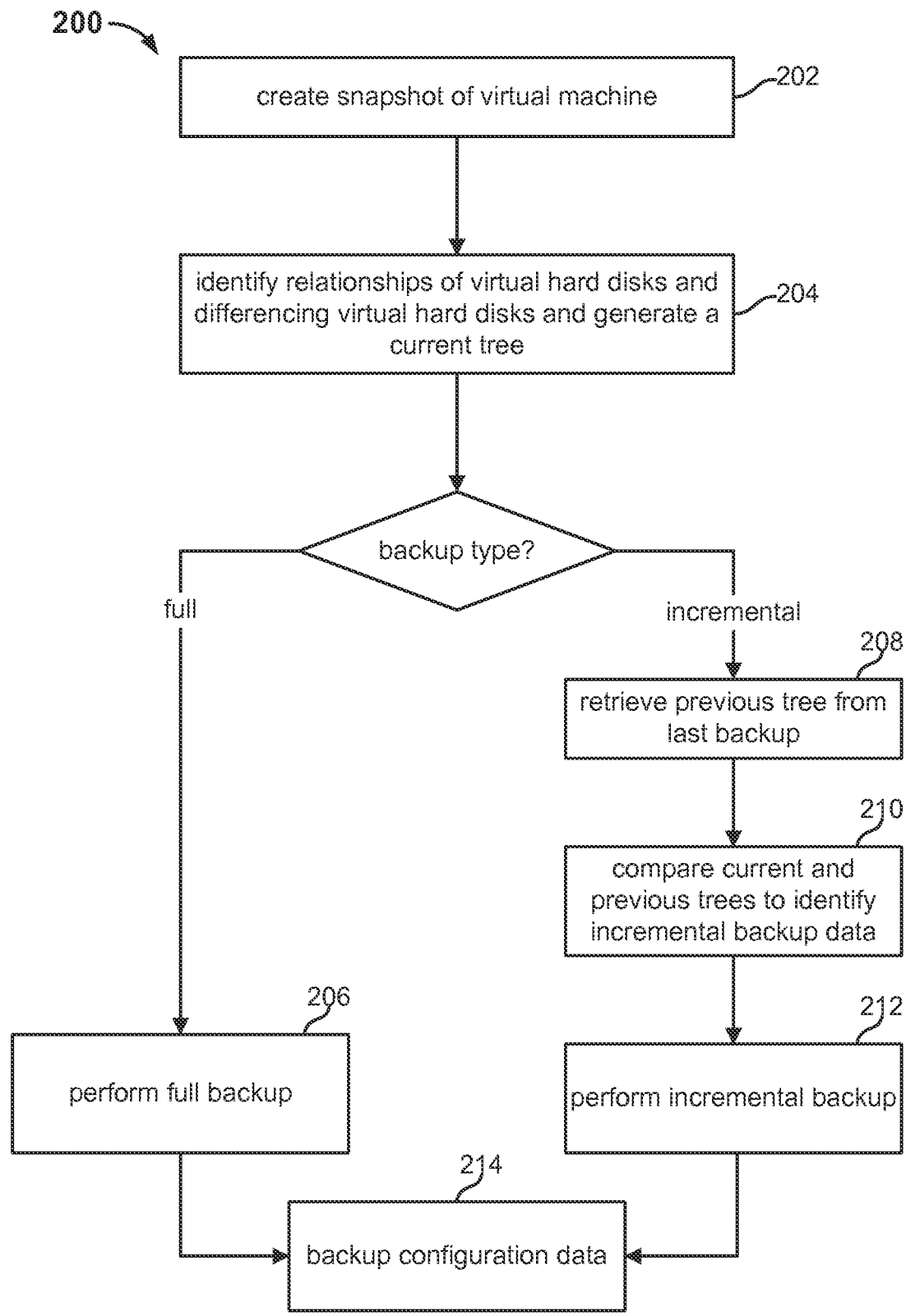
FIG. 2 is a flow chart illustrating an embodiment of a virtual machine backup process.

FIG. 2 is a flow chart illustrating an embodiment of a virtual machine backup process. In some embodiments, process 200 is employed by NMM 106 of FIG. 1, for example, when a request to backup virtual machine 104 is received from backup server 112. Process 200 starts at step 202 at which a snapshot of the virtual machine is created. For example, the VSS framework may be employed to create a snapshot of the virtual machine at step 202. The snapshot created at step 202 generates a list of virtual hard disks and differencing virtual hard disks of all user snapshots and recovery snapshots associated with the virtual machine.

At step 204, the list of virtual hard disks and differencing virtual hard disks associated with the virtual machine obtained via the snapshot of step 202 is traversed to identify relationships of the various virtual hard disks and differencing virtual hard disks. In some such cases, the list of virtual hard disks and differencing virtual hard disks is sorted and organized into a chain or tree structure comprising parent and child nodes with child nodes pointing to their corresponding parent nodes.

In the case of a full backup, all virtual hard disks and differencing virtual hard disks associated with the virtual machine are backed up at step 206. Moreover, the tree specifying the relationships of the virtual hard disks and differencing virtual hard disks is backed up at step 206. More specifically, step 206 comprises providing full backup data to a storage node at which the backup data is to be stored. A full backup is performed at step 206 when a previous synthetic full backup of the virtual machine does not exist at the storage node at which the current backup is to be stored. This may occur, for example, the first instance the virtual machine is backed up or when the virtual machine is backed up to a new or different storage node, for instance, because a previous storage node at which the virtual machine data was formerly being backed up has become full or has insufficient remaining capacity.

In the case of an incremental backup, differencing virtual hard disks not present in the previous backup of the virtual machine are identified and backed up. At step 208, a previous tree or list of sorted virtual hard disks and differencing virtual hard disks associated with the virtual machine from the last backup of the virtual machine is retrieved, for example, from the storage node at which the last backup of the virtual machine is stored. At step 210, the current tree generated at step 204 is compared with respect to the previous tree retrieved at step 208 to identify the differencing virtual hard disks comprising the incremental backup data, i.e., the differencing virtual hard disks not present in the previous backup. At step 212, the incremental data identified at step 210 is backed up. That is, the incremental data is provided to the backup storage node at which the incremental data is merged with the last synthetic full backup to generate a current synthetic full backup and the previous tree is updated to mirror the current tree.

In addition to the full or incremental backup of the virtual hard disks and differencing virtual hard disks of the virtual machine at steps 206 or 212, configuration data associated with the virtual machine is backed up at step 214. That is, a container for backing up configuration files (e.g., .xml, .bin, transfer files, etc.) is generated and linked with other backup containers of the virtual machine and provided to the corresponding storage node at step 214.

As described, backup process 200 takes into consideration both recovery and user snapshots in the event that the two types of snapshots coexist. An incremental backup is performed that consolidates both recovery and user snapshots and is subsequently employed to generate a synthetic full backup.

Figure 3:
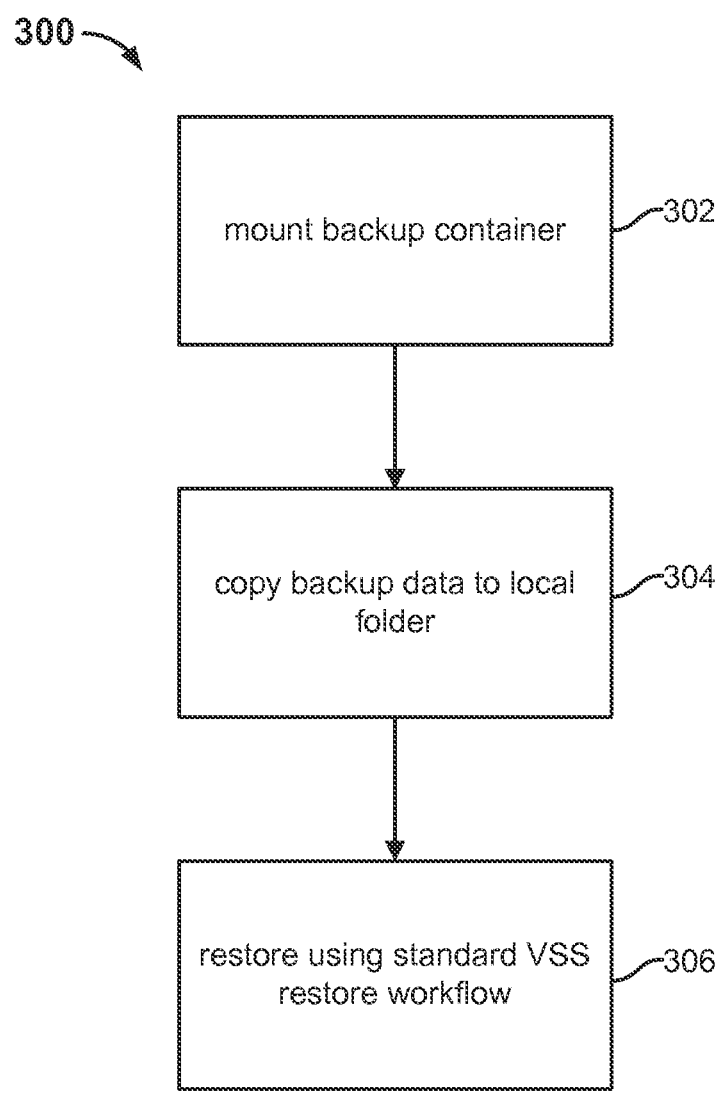
FIG. 3 is a flow chart illustrating an embodiment of a process for restoring a backup of a virtual machine.

FIG. 3 is a flow chart illustrating an embodiment of a process for restoring a backup of a virtual machine. In some embodiments, process 300 is employed by NMM 106 of FIG. 1, for example, when a request to restore a synthetic full backup of virtual machine 104 is received. Process 300 starts at step 302 at which a backup container is mounted. At step 304, the virtual hard disk and differencing virtual hard disk files as well as the configuration files comprising the synthetic full backup of the virtual machine are copied to a local folder from the storage node at which the backup is stored. At step 306, the standard VSS restore workflow is employed to restore the virtual machine.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
obtaining a current list of virtual hard disks and differencing virtual hard disks associated with a virtual machine, wherein at least some of the differencing virtual hard disks are created from coexisting automatic and manual snapshots of the virtual machine and wherein an automatic snapshot is created by an automated backup process and a manual snapshot is manually created by a user at a desired time;
generating a current tree of the virtual machine having nodes representing the virtual hard disks and the differencing virtual hard disks associated with the virtual machine, wherein differencing virtual hard disks point to corresponding parent virtual hard disks in the generated current tree and wherein the current tree is generated by sorting the obtained current list and identifying relationships between the virtual hard disks and the differencing virtual hard disks associated with the virtual machine;
retrieving a previous tree of virtual hard disks and differencing virtual hard disks associated with the virtual machine that is stored with a last backup of the virtual machine;
comparing the generated current tree of the virtual machine with the retrieved previous tree from the last backup of the virtual machine;
identifying differencing virtual hard disks in the current tree that are not present in the previous tree as incremental backup data; and
backing up the identified incremental backup data, wherein the incremental backup data is merged with a previous synthetic full backup of the virtual machine to generate a current synthetic full backup of the virtual machine that consolidates coexisting automatic and manual snapshots and wherein the previous tree in storage is updated to include nodes representing the differencing virtual hard disks comprising the incremental backup data;
wherein the method generates a synthetic full backup of the virtual machine when automatic and manual snapshots of the virtual machine coexist by applying an incremental backup to the last synthetic full backup of the virtual machine.

2. The method of claim 1, wherein the virtual machine comprises a Microsoft Hyper-V virtual machine that does not have provisions for taking incremental backups when automatic and manual snapshots coexist.

3. The method of claim 1, wherein each snapshot captures state, data, and hardware configuration of the virtual machine at a time that snapshot is generated.

4. The method of claim 1, wherein each differencing virtual hard disk stores operating system files, application data, and data changes made during the execution of the virtual machine.

5. The method of claim 1, wherein each of the current and previous trees comprises parent and child nodes representing virtual hard disks and differencing virtual hard disks associated with the virtual machine.

6. The method of claim 1, further comprising editing configuration data associated with the virtual machine.

7. The method of claim 1, further comprising backing up configuration data associated with the virtual machine.

8. A system, comprising:
a processor configured to:
obtain a current list of virtual hard disks and differencing virtual hard disks associated with a virtual machine, wherein at least some of the differencing virtual hard disks are created from coexisting automatic and manual snapshots of the virtual machine and wherein an automatic snapshot is created by an automated backup process and a manual snapshot is manually created by a user at a desired time;
generate a current tree of the virtual machine having nodes representing the virtual hard disks and the differencing virtual hard disks associated with the virtual machine, wherein differencing virtual hard disks point to corresponding parent virtual hard disks in the generated current tree and wherein the current tree is generated by sorting the obtained current list and identifying relationships between the virtual hard disks and the differencing virtual hard disks associated with the virtual machine;
retrieve a previous tree of virtual hard disks and differencing virtual hard disks associated with the virtual machine that is stored with a last backup of the virtual machine;
compare the generated current tree of the virtual machine with the retrieved previous tree from the last backup of the virtual machine;
identify differencing virtual hard disks in the current tree that are not present in the previous tree as incremental backup data; and
back up the identified incremental backup data, wherein the incremental backup data is merged with a previous synthetic full backup of the virtual machine to generate a current synthetic full backup of the virtual machine that consolidates coexisting automatic and manual snapshots and wherein the previous tree in storage is updated to include nodes representing the differencing virtual hard disks comprising the incremental backup data;
wherein the processor generates a synthetic full backup of the virtual machine when automatic and manual snapshots of the virtual machine coexist by applying an incremental backup to the last synthetic full backup of the virtual machine; and
a memory coupled to the processor and configured to provide the processor with instructions.

9. The system of claim 8, wherein the virtual machine comprises a Microsoft Hyper-V virtual machine that does not have provisions for taking incremental backups when automatic and manual snapshots coexist.

10. The system of claim 8, wherein each snapshot captures state, data, and hardware configuration of the virtual machine at a time that snapshot is generated.

11. The system of claim 8, wherein each differencing virtual hard disk stores operating system files, application data, and data changes made during the execution of the virtual machine.

12. The system of claim 8, wherein each of the current and previous trees comprises parent and child nodes representing virtual hard disks and differencing virtual hard disks associated with the virtual machine.

13. The system of claim 8, wherein the processor is further configured to back up configuration data associated with the virtual machine.

14. A computer program product embodied in a non-transitory computer readable storage medium and comprising computer instructions for:

obtaining a current list of virtual hard disks and differencing virtual hard disks associated with a virtual machine, wherein at least some of the differencing virtual hard disks are created from coexisting automatic and manual snapshots of the virtual machine and wherein an automatic snapshot is created by an automated backup process and a manual snapshot is manually created by a user at a desired time;

generating a current tree of the virtual machine having nodes representing the virtual hard disks and the differencing virtual hard disks associated with the virtual machine, wherein differencing virtual hard disks point to corresponding parent virtual hard disks in the generated current tree and wherein the current tree is generated by sorting the obtained current list and identifying relationships between the virtual hard disks and the differencing virtual hard disks associated with the virtual machine;

retrieving a previous tree of virtual hard disks and differencing virtual hard disks associated with the virtual machine that is stored with a last backup of the virtual machine;

comparing the generated current tree of the virtual machine with the retrieved previous tree from the last backup of the virtual machine;

identifying differencing virtual hard disks in the current tree that are not present in the previous tree as incremental backup data; and backing up the identified incremental backup data, wherein the incremental backup data is merged with a previous synthetic full backup of the virtual machine to generate a current synthetic full backup of the virtual machine that consolidates coexisting automatic and manual snapshots and wherein the previous tree in storage is updated to include nodes representing the differencing virtual hard disks comprising the incremental backup data;

wherein the computer program product generates a synthetic full backup of the virtual machine when automatic and manual snapshots of the virtual machine coexist by applying an incremental backup to the last synthetic full backup of the virtual machine.

15. The computer program product of claim 14, wherein the virtual machine comprises a Microsoft Hyper-V virtual machine that does not have provisions for taking incremental backups when automatic and manual snapshots coexist.

16. The computer program product of claim 14, wherein each snapshot captures state, data, and hardware configuration of the virtual machine at a time that snapshot is generated.

17. The computer program product of claim 14, wherein each differencing virtual hard disk stores operating system files, application data, and data changes made during the execution of the virtual machine.

18. The computer program product of claim 14, wherein each of the current and previous trees comprises parent and child nodes representing virtual hard disks and differencing virtual hard disks associated with the virtual machine.

19. The computer program product of claim 14, further comprising computer instructions for editing configuration data associated with the virtual machine.

20. The computer program product of claim 14, further comprising computer instructions for backing up configuration data associated with the virtual machine.

21. The system of claim 8, wherein the processor is further configured to edit configuration data associated with the virtual machine.

\* \* \* \* \*